United States Patent [19]

Hunter

[11] Patent Number: 4,826,422

[45] Date of Patent: May 2, 1989

[54] RESTRICTION INSERT FOR AN EXTRUSION DIE

[75] Inventor: Stephen B. Hunter, Dardanelle, Ak.

[73] Assignee: The Firestone Tire & Rubber Company, Akron, Ohio

[21] Appl. No.: 143,658

[22] Filed: Jan. 13, 1988

[51] Int. Cl.⁴ ............................................. B29C 47/20
[52] U.S. Cl. ..................... 425/461; 264/209.8; 264/211.13; 425/380; 425/382.4; 425/467
[58] Field of Search ............ 425/461, 467, 382.4, 425/376.1, 380, 464; 264/209.8, 211.13; 428/35, 36; 138/40, 44

[56] References Cited

U.S. PATENT DOCUMENTS

| | | | |
|---|---|---|---|
| 1,184,254 | 5/1916 | McBean | 425/467 |
| 1,513,589 | 10/1924 | Denison | 425/467 X |
| 1,768,671 | 7/1930 | Devine | 425/467 |
| 3,146,495 | 9/1964 | Sanford | 425/380 |
| 3,266,092 | 8/1966 | Corbett | 425/462 |
| 3,709,645 | 1/1973 | Mraz | 425/192 R |
| 4,045,154 | 8/1977 | Ratheiser | 425/467 |
| 4,061,461 | 12/1977 | Hessenthaler | 425/467 X |
| 4,165,210 | 8/1979 | Corbett | 425/133.5 |
| 4,321,228 | 3/1982 | De Kok | 425/467 X |
| 4,459,250 | 7/1984 | Miura et al. | 425/382.4 X |
| 4,509,907 | 4/1985 | Ratheiser | 425/197 |
| 4,573,893 | 3/1986 | Waters et al. | 425/461 X |
| 4,655,987 | 4/1987 | Zertuche | 425/467 X |
| 4,723,902 | 2/1988 | Erickson | 425/467 X |

FOREIGN PATENT DOCUMENTS 1940195  3/1917  Fed. Rep. of Germany .

Primary Examiner—Richard L. Chiesa
Attorney, Agent, or Firm—Ronald Brietkrenz

[57] ABSTRACT

A restriction insert adapted to be mounted on a spider of an extrusion die has a generally hollow body formed by integral first and second conical walls wherein the first conical wall has a larger inner diameter than that of the second conical wall. A pair of spaced axially extending material inner flow passages are formed concentrically about the axial bore opening in an outer end of the second conical wall and communicates with the interior of the body. A frustro-conical shaped groove is formed in the outer end of the second conical wall within the interior of the body to provide a tapered flow path for the material entering the inner flow passages. A pair of outer flow passages are formed concentrically in an annular shoulder at the junction of the conical walls. A generally pointed annular edge is formed on the interior of the second conical wall and in combination with the tapered inner surface of the first conical wall form tapered flow paths for the material entering the outer flow passages. The outer flow passages radially overlap adjacent ends of the inner flow passages whereby two concentric sleeves of material are produced which are radially compressed together in forming the final tubular extrudate to eliminate uneven gauge and trapped air caused by the flow of material around spider legs prior to passing through the extrusion orifice.

19 Claims, 2 Drawing Sheets

RESTRICTION INSERT FOR AN EXTRUSION DIE

TECHNICAL FIELD

The invention relates to extrusion dies and in particular to a restriction insert for mounting at the entrance to the die, which die preferably is used for the extrusion of an elastomeric sleeve. More particularly, the invention relates to a restriction insert which eliminates or reduces the uneven gauge and trapped air in the elastomeric sleeve caused when the material mass flows around spider legs prior to passing through the die.

BACKGROUND ART

Dies are used for the extrusion of various types of materials and in particular for forming an extrudate into a sleeve or tubular form. Such dies are used with various types of thermoplastic materials and elastomeric materials. The molten resin is forced through an annular orifice which forms the final tubular extrudate. Normally the molten resin enters the die chamber in one or more streams of material caused by the passing of the molten resin past the radially extending legs of a spider before being rejoined in the extrusion die chamber. The locations at which the streams of resin rejoin have been found to form a seam or reduced gauge in the final tubular extrudate which, depending upon the particular product being formed from the extrudate, can present a weakened area. Furthermore, the rejoining of the streams of material may result in the formation of air pockets which produce blisters on the tubular extrudate after passing through the extrusion die.

This problem has been recognized in the art, particularly in the extrusion of thermoplastic materials. U.S. Pat. No. 4,509,907 attempts to solve this problem by the use of an extrusion head which forces the streams of thermoplastic material through flow passages having tapered cross-sectional configurations in order to develop a back pressure within the die chamber to assist in blending the separate streams of resin.

U.S. Pat. No. 3,146,495 discloses a molding machine which attempts to overcome this problem by passing the separated streams of material caused by the spider legs through a series of skewed flow passages formed in a baffle plate to create a swirling effect whereby the individual flow streams are more easily rejoined into a final mass before passing through the extrusion die.

U.S. Pat. No. 3,266,092 discloses a flow die which attempts to solve this problem by the formation of a die anchor ring having four inner overlapping arcuate flow passages and four outer overlapping flow passages, all of which have tapered ends which nest within each other. With this configuration the molten material is divided into four inner streams and four concentric outer streams which are caused to overlap in order to form a pair of concentric sleeves which are then merged together in forming the final tubular extrudate.

Still other prior art extrusion dies and equipment have been developed in an attempt to eliminate this problem or other problems similar thereto. Examples of these prior art devices are shown in U.S. Pat. Nos. 3,709,645 and 4,165,210 and in German Pat. No. 1,940,195.

Although these known prior art devices may provide solutions to the problems for which they were developed, they are used primarily for thermoplastic materials which are forced through the die at a considerably reduced pressure than the pressures exerted on a mass of molten elastomeric material, such as that used in the formation of an elastomeric tubular extrudate used in the formation of inner tubes for pneumatic tires. For example, the extremely high pressures that would be exerted against the slightly tapered surfaces of the die anchor ring such as shown in U.S. Pat. No. 3,266,092, would require an extremely thick and heavy ring in order to eliminate outward bowing of the end wall area of the ring and adjacent metal components.

Therefore, the need has existed for an improved restriction insert for an extrusion die, which die is intended primarily for use in the extrusion of an elastomeric tubular extrudate to reduce or eliminate the uneven gauge and trapping of air in the extrudate which results when the molten elastomeric mass flows around the spider legs, and whereon the insert is able to withstand the extremely high pressures which are exerted on the restriction insert.

DISCLOSURE OF THE INVENTION

Objectives of the invention include providing a restriction insert for an extrusion die which eliminates or reduces the formation of air bubbles and uneven gauge in the final tubular extrudate caused by the passing of molten elastomeric material past the radially projecting spider legs of an extrusion die, and which eliminates or reduces the heretofore formed radially extending seam or joint which resulted therefrom causing a weakened area, by forcing the elastomeric material through overlapping pairs of concentric flow passages to form a plurality of arcuate-shaped streams of material which are subsequently joined by the back pressure in the extrusion die chamber into a pair of concentric sleeves which the are joined in the flow channel of the extrusion die prior to passing through the extrusion orifice resulting in the seam being formed in an axial longitudinal direction as opposed to the undesirable radial seam as heretofore occurred due to the radially extending spider legs.

A further objective is to provide such a restriction insert in which the material moving through the flow passages of the insert causes a pressure increase which breaks up and disperses out by normal porosity air pockets trapped in the elastomeric material; and in which the overlapping flow passages meter the flow of material by restriction of all of the moving elastomeric material except that which can flow through the restriction insert to form a uniform tubular extrudate free of radially extending seams and blisters caused by trapped pockets of air.

A still further objective of the invention is to provide such a restriction insert in which the inner surfaces are tapered toward the inner and outer pairs of arcuate flow passages to reduce the extremely high pressures exerted against the end wall or other flat surface areas of the insert by reducing such flat areas as occurs in prior art die restriction inserts.

Still another objective of the invention is to provide such a restriction insert in which relatively sharp arcuate edges are provided adjacent the outer arcuate flow paths enabling the moving elastomeric material to separate easily for movement either through the outer flow passages or inner flow passages further reducing the heretofor flat areas against which the high extrusion pressures were exerted.

A still further objective of the invention is to provide such an extrusion insert which forms two overlapping tubular streams of materials, which when compressed together by radial pressure on the two separated streams or sleeves, provide a good bond therebetween which eliminates the formation of a seam in the radial direction as heretofore occurred in prior art tubular extrudates.

Another objective of the invention is to provide such a restriction insert which can be formed of a single, integral one-piece rigid metal member that can be easily mounted within the extrusion head of a usual extrusion press and which can be formed of a reduced thickness since it is able to withstand the high internal extrusion pressures by reducing the amount of flat surface areas by providing tapered surfaces and pathways for directing the flowing elastomeric materials into the pairs of overlapping concentric flow passages.

Another objective of the invention is to provide such a restriction insert which provides a sturdy and durable member relatively inexpensive to manufacture and maintain, and which achieves the objectives of the invention in a relatively simple, yet highly efficient manner.

These objectives and advantages are obtained by the improved restriction insert of the invention which is adapted to be mounted on the hub of a spider of an extrusion die, the general nature of which may be stated as including a generally hollow body having a central axial bore adapted to receive the hub of a spider therein; a pair of equally spaced inner arcuate flow passages formed in the body, said inner passages extending axially concentrically about the central axial bore; a pair of equally spaced outer arcuate flow passages formed in the insert body, said outer passages extending axially concentrically about the central axial bore and inner passages, each of said outer passages having an arcuate length greater than the arcuate length of each of the inner flow passages; and the outer flow passages radially overlapping adjacent ends of the inner flow passages.

BRIEF DESCRIPTION OF THE DRAWINGS

A preferred embodiment of the invention, illustrative of the best mode in which applicant has contemplated applying the principles, is set forth in the following description and is shown in the drawings and is particularly and distinctly pointed out and set forth in the appended claims.

Similar numerals refer to similar parts throughout the drawings.

BEST MODE FOR CARRYING OUT THE INVENTION

Figure 1:
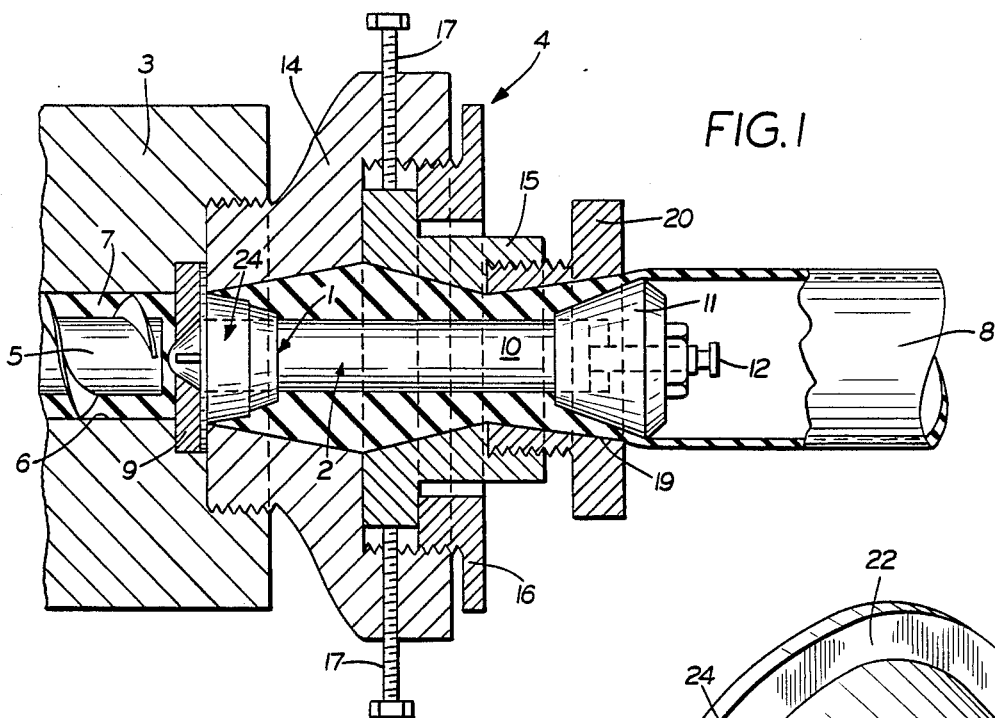
FIG. 1 is a generally diagrammatic sectional view of a type of extrusion die and feed member in which the improved restriction insert is mounted.
Figure 2:
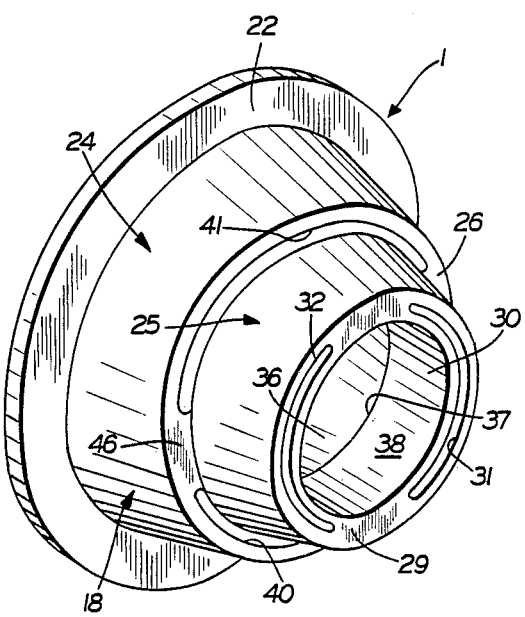
FIG. 2 is a perspective view of the restriction insert of the invention.

The restriction insert of the invention is indicated generally at 1, and is shown particularly in FIGS. 1–5. Insert 1 is shown in FIG. 1 in a usual operating position mounted on a spider assembly indicated generally at 2, at the exit end of a an extruder sleeve 3 adjacent an extrusion die, indicated generally at 4. A usual extruder screw 5 is rotatably mounted within a bore 6 for moving a quantity of an elastomeric material 7 therealong which, for the present discussion, is the type of elastomeric material used in forming a tubular extrudate 8 for the subsequent forming of an inner tube for a pneumatic tire.

Spider assembly 2 is of a usual construction having a plurality of radially outwardly extending spider legs 9 and an axially extending shaft 10 for mounting of a mandrel 11 on the outer end thereof. Spider shaft 10 preferably is hollow having an outer water jacket and a hollow interior enabling the pressurized blowing of soapstone, or the like, outwardly through an end nozzle 12 for injection into the interior of molded extrudate 8.

Extrusion die 4 includes a usual extrusion head 14, a die holder 15, a die holder lock ring 16 and a plurality of adjusting screws 17 for adjusting the die holder to regulate the gauge of the tubular sleeve which is formed upon the forcing of the elastomeric material through extrusion orifice 19. Orifice 19 is the annular space formed between a usual die 20 and mandrel 11.

The particular construction of spider assembly 2 and extrusion die 4 is well known in the art, and is set forth in FIG. 1 to illustrate one type of spider assembly and extrusion die on which improved restriction insert 1 may be mounted. Other types of extrusion dies nd spider assemblies may be utilized than that shown in FIG. 1 and described above, without affecting the concept of the invention.

Figure 7:
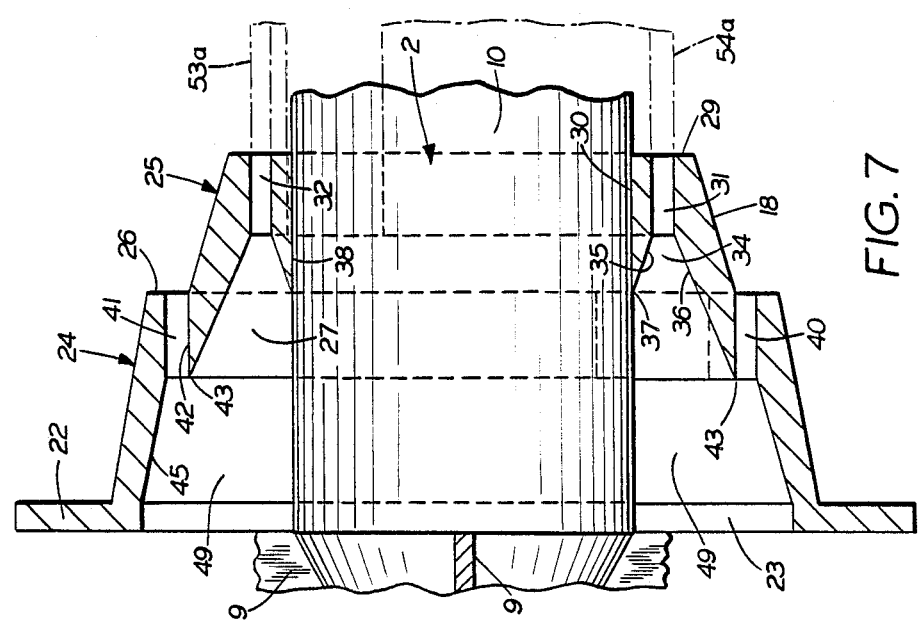
FIG. 7 is an enlarged sectional view taken on line 7—7, FIG. 3, including a portion of the spider shaft.
Figure 6:
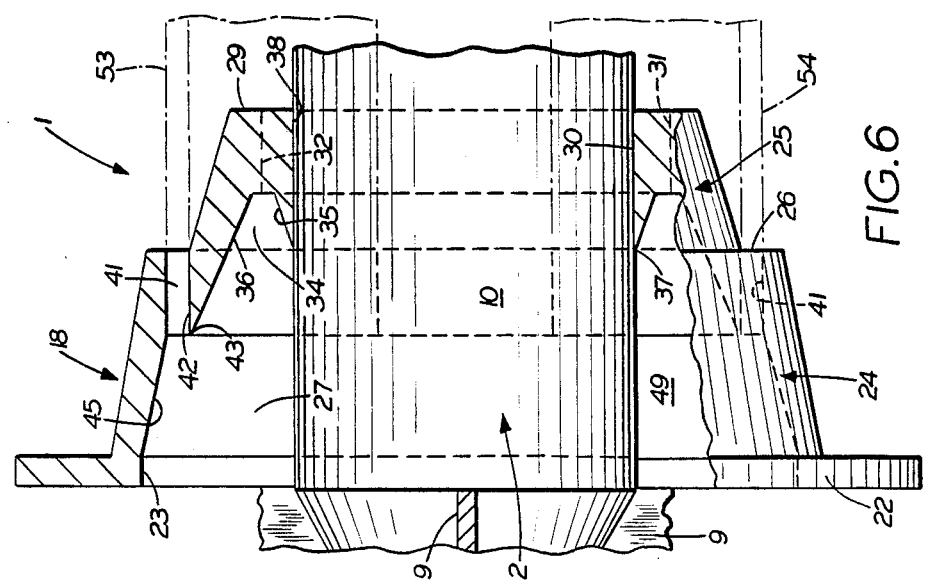
FIG. 6 is an enlarged sectional view taken on line 6—6, FIG. 3, with portions broken away, and with a portion of a spider shaft extending therethrough.

Restriction insert 1 preferably is formed as a one-piece integral metal member or body 18 having an annular base 22 formed with a central opening 23 through which spider shaft 10 extends. Annular base 22 provides the means for mounting the restriction insert on the spider assembly such as shown in FIG. 1, wherein it is clamped on the spider assembly by extrusion head 14. Insert 1 further includes a first conical wall indicated generally at 24, and a second conical wall indicated generally at 25. Conical walls 24 and 25 are joined by an annular radially extending shoulder 26, and together form a hollow interior 27 for body 18. Conical wall 24 has larger inner and outer diameters throughout its axial length than the inner and outer diameters of conical wall 25, thus resulting in the formation of annular shoulder 26. Conical wall 25 terminates in an outer annular end wall 29 which is formed with a central opening 30 generally complementary to the diameter of spider shaft 10 which is inserted therethrough (FIGS. 6 and 7).

In accordance with the invention, a pair of inner arcuate-shaped concentric slots or flow passages 31 and 32 are formed in annular end wall 29 of conical wall 25 (FIGS. 2, 3, 7 and 8), and extend in an axial direction into hollow interior 27 of body 18. The preferred arcuate length of each flow passage 31 and 32 is approximately 135° which leaves an arcuate spacing of approximately 45° between the ends thereof. This material, together with the remaining material of end wall 29 which surrounds the passages, provides sufficient metal to resist the high internal pressures exerted on the end wall by the moving elastomeric material. Although more than two arcuate flow passages or slots 31 and 32 could be utilized, two has been found to be most satisfactory since they provide a sufficient void for the flow of material therethrough while retaining a sufficient amount of material between the ends thereof for resisting the pressure of the moving elastomeric material.

A generally frustro-conical shaped groove 34 is formed on the interior of end wall 29 of conical wall 25 at the junction with the interior surface of conical wall 25, which provides inwardly tapered wall surfaces 35 and spaced tapered surfaces 36 which merge into flow passages 31 and 32. Furthermore, slope surfaces 35 form generally sharp arcuate edges 37 with the junction of axially extending annular wall surface 38 which defines axial bore opening 30. Sharp edges 37 eliminate any flat surfaces when insert 1 is assembled with spider shaft 10 as shown in FIGS. 6 and 7 against which the high pressure of the flowing elastomeric material would be compressed.

In further accordance with the invention, a pair of outer arcuate-shaped concentric slots or flow passages 40 and 41 are formed in annular shoulder 26 and extends axially therethrough generally parallel with the central axis of the insert sleeve and parallel with inner passages 31 and 32. Inner tapered surface 36 of conical wall 25 terminates within the hollow interior of body 18 (FIG. 7) and together with axially extending arcuate walls 42 of outer passages 40 and 41 form an annular generally sharp edge 43. Edge 43 assists in cutting through and dividing the elastomeric material as it flows through hollow interior 27 directing it either along passages 40 and 41 or channeling it along tapered surfaces 36 and into inner passages 31 and 32. Again, sharp edge 43 eliminates a flat surface or area which would be subjected to the axially directed high internal pressures of the moving elastomeric material. The tapered inner annular surface 45 of conical wall 24 further assists in directing and compressing the flowing material and directing it toward and into outer passages 40 and 41.

The preferred arcuate length of outer concentric passages 40 and 41 preferably is 145°. This provides sections of metal wall material 46 and 47 therebetween extending an arcuate length of approximately 35°. This metal area has a sufficient width for resisting the high internal pressures as the elastomeric material is being channeled and compressed for subsequent flow through the inner and outer arcuate passages. The axial lengths of outer flow passages 40 and 41 preferably are equal to the axial lengths of inner flow passages 31 and 32 as shown in FIG. 7.

The operation of restriction insert 1 is best illustrated in FIG. 1. A mass of elastomeric material 7 is advanced forwardly by extruder screw 5 where it passes beyond spider legs 9 which form radially extending seams of slits in the mass of material. The material is then directed into a generally annular-shaped channel 49 or passageway (FIGS. 6 and 7) formed by opening 23 of base 22 about spider shaft 10. The material then is gradually compressed by the tapered configuration of wall 45 of conical wall 24 which closes the radial slits formed by the spider legs.

A portion of the elastomeric material is then separated into two concentric arcuate-shaped segments which are shown by dot-dash lines 53 and 54 (FIGS. 6 and 7) by passing through outer concentric passages 40 and 41. The remaining material is further compressed by tapered surfaces 35 and 36 for entering through inner arcuate passages 31 and 32 where it is subsequently compressed and formed into two arcuate segments shown by dot-dash lines 53a and 54a by the concentric passages. These four segments are then compressed by the back pressure created within the flow channels into a generally bonded mass as shown in FIG. 1. Each pair of arcuate segments form a cylinder which are concentric with each other. These two cylinders then are subsequently compressed in a radial direction as they move through extrusion orifice 19 resulting in a bonded mass wherein any resulting seam extends only in the longitudinal direction between the two compressed cylinders and not in the radial direction as heretofore caused by the spider legs.

Accordingly, improved restriction insert 1 provides for the elimination of radially extending seam lines or reduced gauge in a tubular extrudate heretofor caused by the radial spider legs by compressing the elastomeric material into two concentric pairs of overlapping arcuate segments, which segments are then further compressed in a radial direction upon movement through the extrusion orifice. Thus, any bonding or resultant seams extend in a longitudinal direction preventing the formation of any uneven gauge in the sidewall of the tubular extrudate as may occur when radial seams are created. Furthermore, the compression of the material in a radial direction upon moving through the restricted passages of insert 1 furthermore destroys any air pockets that may have formed in the elastomeric material when passing beyond spider legs 9.

Also of critical importance is the elimination or reduction of substantially flat areas within interior 27 of body 18 which are encountered by the moving mass of elastomeric material. This is achieved by the various tapered inner surfaces of conical walls 24 and 25 and the subsequent formation of sharp annular edges 37 and 43 whereby the material is channeled by the tapered surfaces into the respective arcuate flow passages.

Figure 3:
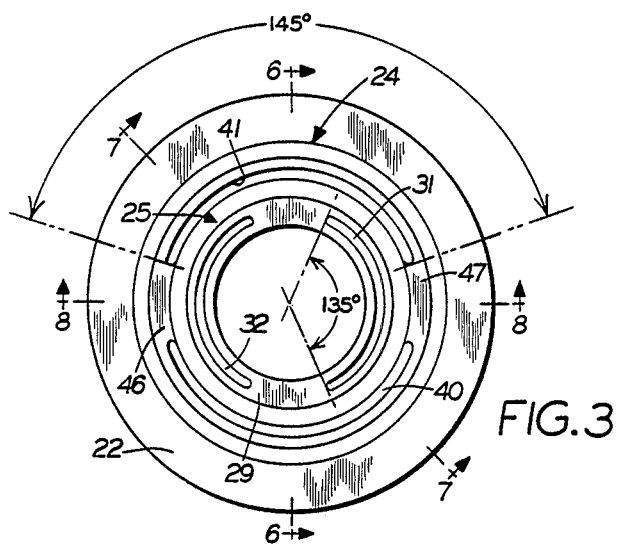
FIG. 3 is a right-hand end view of the restriction insert of FIG. 2.
Figure 4:
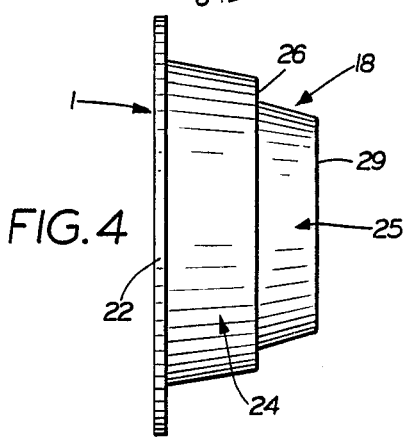
FIG. 4 is a side elevational view of the insert of FIG. 2.
Figure 5:
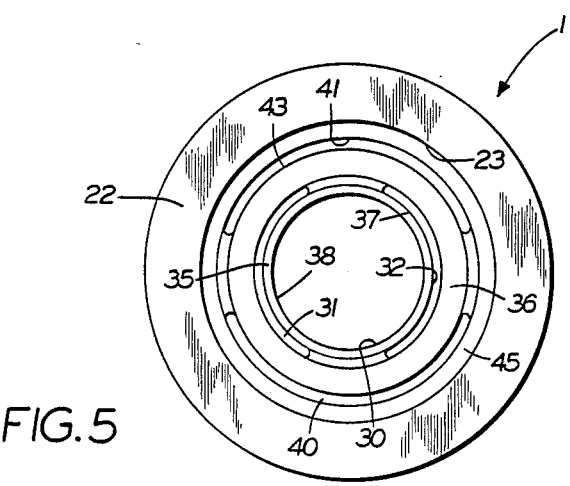
FIG. 5 is a left-hand end view of the insert of FIG. 2.
Figure 8:
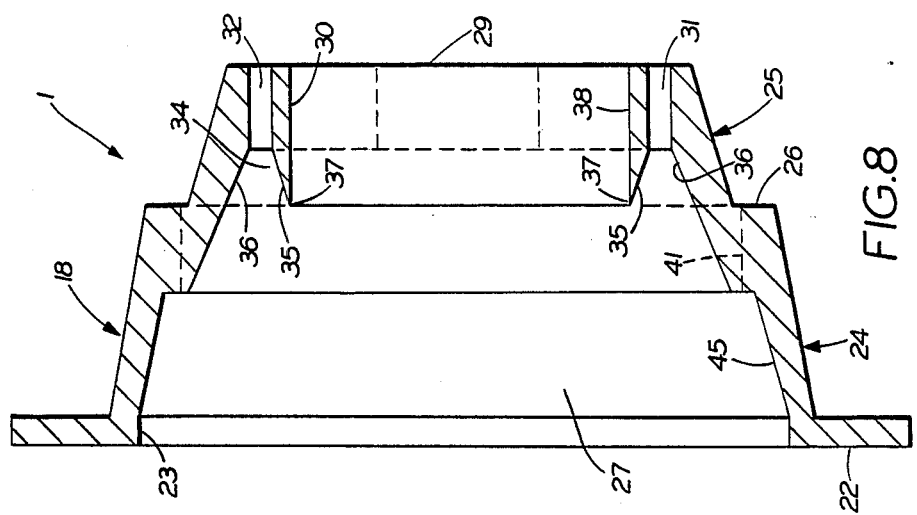
FIG. 8 is an enlarged sectional view taken on line 8—8, FIG. 3 with the spider shaft removed therefrom.

As shown particularly in FIG. 3, outer passages 40 and 41 overlap the adjacent ends of inner passages 31 and 32 in a generally equal relationship. This insures that even the longitudinal seams or junction lines between the pairs of inner and outer arcuate extrudates do not align radially with each other, but are spaced approximately 90° apart further strengthening the tubular extrudate.

Accordingly, the improved restriction insert is simplified, provides an effective, safe, inexpensive, and efficient device which achieves all the enumerated objectives, provides for eliminating difficulties encountered with prior devices, and solves problems and obtains new results in the art.

In the foregoing description, certain terms have been used for brevity, clearness and understanding; but no unnecessary limitations are to be implied therefrom beyond the requirements of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the improved restriction insert is constructed and used, the characteristics of the construction, and the advantageous, new and useful results obtained; the new and useful structures, devices, elements, arrangements, parts, and combinations, are set forth in the appended claims.

What is claimed is:

1. A restriction insert for mounting on a spider of an extrusion die including:
   (a) a generally hollow body having a central axial bore adapted to receive a shaft of the spider therein;
   (b) a pair of spaced inner arcuate flow passages formed in the insert body extending axially concentrically about the central axial bore, said passages having adjacent ends spaced circumferentially from each other providing sufficient body material therebetween to withstand high internal pressure exerted thereon by elastomeric material being extruded through said insert;
   (c) a pair of spaced outer arcuate flow passages formed in the insert body extending axially concentrically about the central axial bore and about the inner passages, each of said outer passages having an arcuate length greater than the arcuate length of the inner flow passages and having adjacent ends spaced circumferentially from each other providing sufficient body material therebetween to withstand high internal pressure exerted thereon by elastomeric material being extruded through said insert; and
   (d) each of the outer flow passages radically overlapping a pair of adjacent ends of the inner flow passages, and with discharge ends of said flow passages terminating axially upstream of discharge ends of the inner flow passages.

2. The restriction insert defined in claim 1 in which each of the inner flow passages has an arcuate length of approximately 135°; and in which each of the outer flow passages has an arcuate length of approximately 145°.

3. The restriction insert defined in claim 1 in which the axial lengths of the inner and outer flow passages are generally equal.

4. The restriction insert defined in claim 1 in which the insert body is an integral one-piece metallic member having a base, a first conical wall, and a second conical wall.

5. The restriction insert defined in claim 4 in which the first conical wall has a larger outer diameter than the second conical wall; in which an annular radially extending outer shoulder is formed at a junction of said conical walls; and in which the outer flow passages are formed in said radially extending shoulder.

6. The restriction insert defined in claim 5 in which the second conical wall terminates in an outer annular end; and in which the inner flow passages are formed in said annular end.

7. A restriction insert for mounting on a spider of a die for extruding an elastomeric sleeve of material including a generally hollow body having a central axial bore for receiving the spider and having at least two inner arcuate material flow passages and at least two outer arcuate material flow passages formed in the body concentrically about the axial bore, said outer flow passages overlapping adjacent ends of the inner flow passages for producing inner and outer concentric sleeves of the elastomeric material which are subsequentially joined within a material flow channel of the extrusion die; said body having an inner surface provided with a plurality of tapered areas forming tapered material flow paths communicating with the inner flow passages, and forming generally pointed edges at the start of the outer flow passages to facilitate the flow of elastomeric material through the insert material flow passages, said inner and outer flow passages each comprising two equal arcuate passages equally spaced from each other providing sufficient body material therebetween to withstand high internal pressure exerted thereon by the elastomeric material being extended through said insert, and wherein the termination of the two inner flow passages are spaced axially downstream from the termination of the two outer flow passages, with each of the outer flow passages radially overlapping a pair of end of the spaced inner flow passages.

8. The restriction insert defined in claim 7 in which a frusto conical shaped groove is formed in the inner surface of the insert body, the apex of which communicates with an inner end of the inner flow passages.

9. The restriction insert defined in claim 7 in which the insert body has an annular base for mounting the body on an extrusion die; and in which a central opening is formed in the annular base for receiving the spider and for forming an annular material flow path for the elastomeric material upon it flowing into the interior of the hollow body.

10. The restriction insert defined in claim 7 in which the body is an integral one-piece metallic member having an annular base, a first conical portion and a smaller second conical portion downstream of said first conical portion; in which the inner flow passages are formed in an annular end of the second conical portion; and in which the outer flow passages are formed in an annular shoulder formed at the junction of the first and second conical portions.

11. A restriction insert for mounting on a spider of an extrusion die including:
   (a) a generally hollow body having a central axial bore adapted to receive a shaft of the spider therein, said body being an integral one-piece metallic member having a base, a first conical wall and a second conical wall, said second conical wall terminating in an outer annular end and said first conical wall having a larger outer diameter than the second conical wall with an annular radially extending outer shoulder being formed at a junction of said first and second conical walls;
   (b) a pair of equally spaced inner arcuate flow passages formed in the outer annular end of the second conical wall of the insert body, said inner passages extending axially concentrically about the central axial bore;
   (c) a pair of equally spaced outer arcuate flow passages formed in the radially extending outer shoulder of the insert body, said outer passages extending axially concentrically about the central axial bore and about the inner passages, each of said outer passages having an arcuate length greater than the arcuate length of the inner flow passages; and
   (d) the outer flow passages radially overlapping adjacent ends of the inner flow passages.

12. The restriction insert defined in claim 11 in which the outer flow passages are located axially upstream on the inner flow passages.

13. The restriction insert defined in claim 11 in which the outer annular end has an annular radially extending end surface.

14. The restriction insert defined in claim 13 in which the outer end surface of the second conical wall is spaced axially from and is parallel with the annular shoulder formed at the junction of the conical walls.

15. The restriction insert defined in claim 11 in which the second conical wall has a tapered interior surface which terminates in a generally pointed annular edge at the start of the outer flow passages.

16. The restriction insert defined in claim 15 in which the first conical wall has a tapered inner surface which joins with the outer flow passages to provide a tapered material flow path communicating with said outer flow passages.

17. The restriction insert defined in claim 11 in which the outer annular end of the second conical wall is formed with an interior frusto-conical shaped annular groove; and in which the inner flow passages joins with the apex of said annular groove to provide a tapered material flow path communicating with said inner flow passages.

18. A restriction insert for mounting on a spider of a die for extruding an elastomeric sleeve of material including a generally hollow body having a central axial bore for receiving the spider and having at least two inner arcuate material flow passages and at least two outer arcuate material flow passages formed in the body concentrically about the axial bore, said outer flow passages overlapping adjacent ends of the inner flow passages for producing inner and outer concentric sleeves of the elastomeric material which are substantially joined within a material flow channel of the extrusion die; said body having an inner surface provided with a plurality of tapered areas forming tapered material flow paths communicating with the inner flow passages, and forming generally pointed edges at the start of the outer flow passages to facilitate the flow of elastomeric material through the insert material flow passages, said body being an integral one-piece metallic member having an annular base, a first conical portion and a smaller second conical portion downstream of said first conical portion, with the inner flow passages being formed in an annular end of the second conical portion and with the outer flow passages being formed in an annular shoulder formed at the junction of the first and second conical portions.

19. The restriction insert defined in claim 18 in which the inner and outer flow passages extend axially concentrically about a central axis of the insert body.

* * * * *